United States Patent [19]

Maree

[11] Patent Number: 5,035,807
[45] Date of Patent: Jul. 30, 1991

[54] WATER TREATMENT FOR SULFATE ION REMOVAL

[75] Inventor: Johannes P. Maree, Pretoria, South Africa

[73] Assignee: CSIR, Pretoria, South Africa

[21] Appl. No.: 493,320

[22] Filed: Mar. 14, 1990

[30] Foreign Application Priority Data

Mar. 15, 1989 [ZA] South Africa ............ 89/1972

[51] Int. Cl.$^5$ ............................................. C02F 1/52
[52] U.S. Cl. ...................... 210/711; 210/713;
210/716; 210/718; 210/723; 210/724; 210/912;
210/916; 210/714
[58] Field of Search ............... 210/711, 712, 713, 714,
210/716, 718, 723, 724, 726, 750, 765, 916, 912

[56] References Cited

U.S. PATENT DOCUMENTS

| 1,547,111 | 7/1925 | Finn | 210/723 |
| 1,689,036 | 10/1928 | Leiss | 210/723 |
| 1,964,487 | 6/1934 | Smith | 210/750 |
| 3,725,267 | 4/1973 | Gelblum | 210/711 |
| 3,935,100 | 1/1976 | Alagy et al. | 210/711 |
| 4,031,195 | 6/1977 | Elston | 423/555 |
| 4,070,443 | 1/1978 | Kikuchi et al. | 423/321 S |
| 4,078,048 | 3/1978 | Nadkarni | 423/567 A |
| 4,839,059 | 6/1989 | Maree | 210/603 |

OTHER PUBLICATIONS

"The Chemical Removal of Sulfates", Trusler, G. E., et al. Proceedings, So. Africal Inst. of Chem. Engineers Published 8/15/88.

Primary Examiner—Peter Hruskoci
Assistant Examiner—Krisanne Shideler
Attorney, Agent, or Firm—Michael N. Meller

[57] ABSTRACT

The invention provides a chemical process for the treatment of water containing dissolved calcium and sulphate ions, so as to produce a purified product water having a reduced sulphate ion concentration. Barium sulphide is added to the water to cause precipitation of barium sulphate from the water. The water from which the barium sulphate has been precipitated is then treated with carbon dioxide to form hydrogen sulphide in the water, and the hydrogen sulphide is stripped from the water.

13 Claims, 1 Drawing Sheet

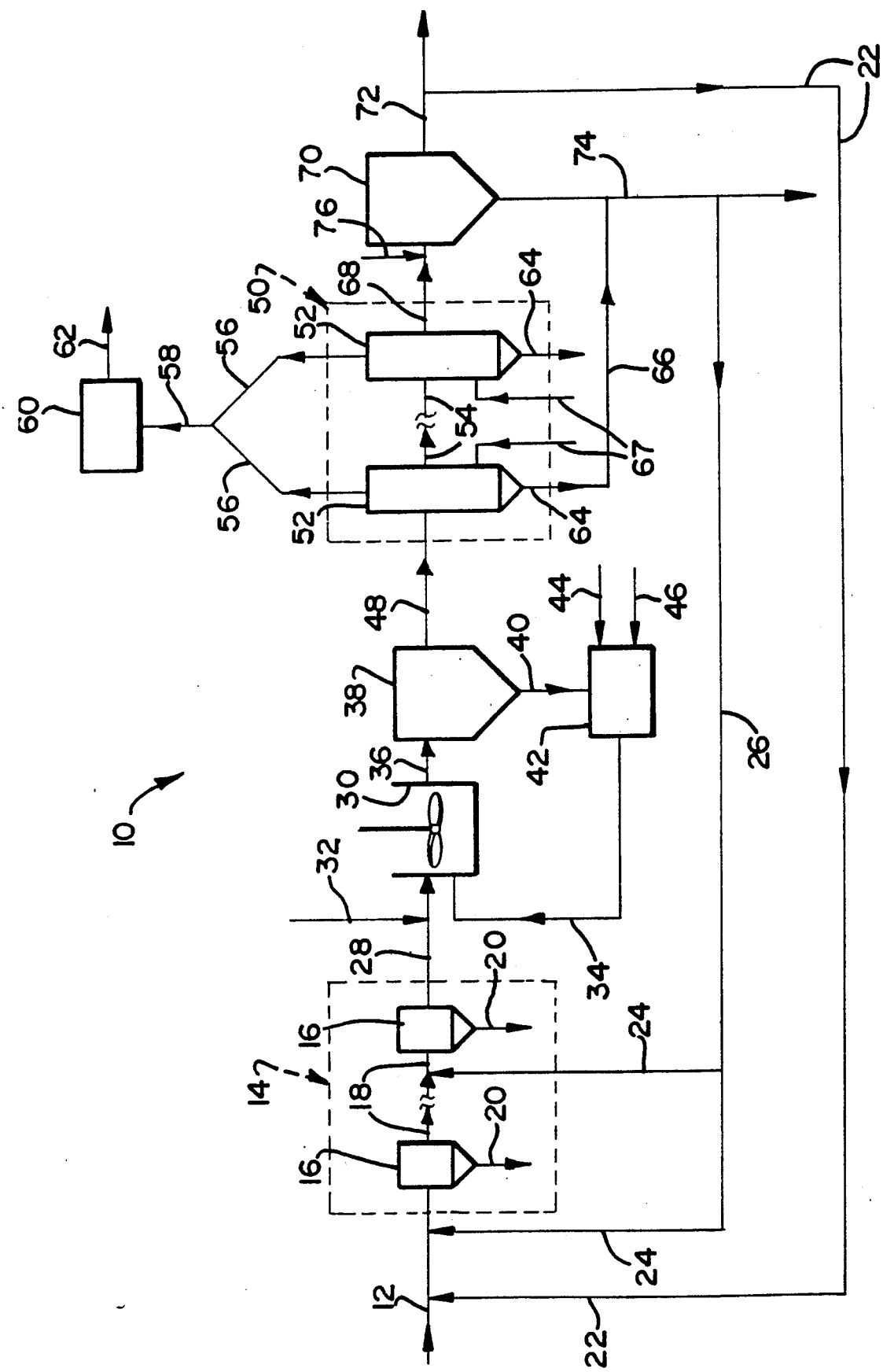

WATER TREATMENT FOR SULFATE ION REMOVAL

This invention relates to the treatment of water. More particularly it relates to a chemical process for the treatment of water containing dissolved calcium and sulphate ions, so as to produce a purified product water having a reduced sulphate ion concentration.

According to the invention there is provided a chemical process for the treatment of water containing dissolved calcium and sulphate ions, so as to produce a purified product water having a reduced sulphate ion concentration, the process comprising the steps of:

adding barium sulphide to the water to cause precipitation of barium sulphate from the water;

treating the water from which the barium sulphate has been precipitated with carbon dioxide to form hydrogen sulphide in the water; and stripping the hydrogen sulphide from the water.

While it is in principle possible to strip the hydrogen sulphide from the water by using carbon dioxide as the stripping gas, it is preferred to add only sufficient carbon dioxide to the water from which the barium sulphate has been precipitated to convert all the sulphide in the water to hydrogen sulphide, air then being used to strip hydrogen sulphide from the water.

During the barium sulphide addition, which is preferably effected by adding an aqueous barium sulphide solution to the water to be treated, the following reaction takes place:

$$BaS + CaSO_4 \rightarrow BaSO_4(\text{precipitate}) + CaS \quad (1)$$

If the raw water is more or less neutral (pH 5–8), this leads to an increase in pH up to about 10–13.

During treatment with carbon dioxide the pH of the water from which the barium sulphate has been precipitated is reduced to about 7, and the following reaction takes place:

$$CaS + CO_2 + H_2O \rightarrow H_2S + CaCO_3(\text{precipitate}) \quad (2)$$

If carbon dioxide is used for the stripping, i.e. if excess carbon dioxide is added to the water so that the water becomes saturated with carbon dioxide, the following reaction takes place:

$$CaS + 2CO_2 + 2H_2O \rightarrow Ca(HCO_3)_2 + H_2S \quad (3)$$

The calcium bicarbonate produced by Reaction (3) remains dissolved in the water, whereas the calcium carbonate produced by Reaction (2) precipitates as crystals. The ratio of calcium carbonate which precipitates to the calcium bicarbonate produced is a function of the final pH of the water. Thus, if carbon dioxide is used for the stripping, the process may include the step of adding water softening by calcium hydroxide to the water to cause crystallization of calcium carbonate according to the reaction:

$$Ca(HCO_3)_2 + Ca(OH)_2 \rightarrow 2CaCO_3(\text{precipitate}) + 2H_2O \quad (4)$$

Instead, the need for calcium hydroxide addition can be reduced by bubbling air through the water which has had the hydrogen sulphide stripped therefrom by carbon dioxide, to strip carbon dioxide from the water, in which case the calcium bicarbonate produced by Reaction (3) is converted to calcium carbonate by the following reaction:

$$Ca(HCO_3)_2 \xrightarrow{\text{air}} CaCO_3 + CO_2 + H_2O \quad (5)$$

Accordingly, the treating of the water with carbon dioxide may be such as to convert all the sulphide dissolved in the water to hydrogen sulphide, and to precipitate calcium carbonate from the water, with the minimum of any calcium bicarbonate production, the stripping of the hydrogen sulphide from the water being by means of air used as a stripping gas. Instead, the treating of the water with carbon dioxide may be sufficient to convert all the sulphide dissolved in the water to hydrogen sulphide, the stripping of the hydrogen sulphide from the water being by means of additional carbon dioxide used as a stripping gas and the process including the step, after the stripping, of converting any calcium bicarbonate dissolved in to the water to calcium carbonate which precipitates from the water.

If the raw water is acidic, e.g. pH 0–5, it can contain heavy metal salts, such as sulphates and chlorides. The heavy metal cations thereof can precipitate with the barium sulphate as sulphides. This has the disadvantage that it is necessary to separate the heavy metal sulphides from the barium sulphate, e.g. by chemical or biological leaching of the heavy metal sulphides from the barium sulphate, if the barium sulphate is to be used for barium sulphide production as described hereunder, and heavy metal sulphides are undesirable for discharging into the environment. However, there can be an advantage in that hydrogen sulphide stripping, because of the low pH's involved (2–7) after barium sulphide addition, can be achieved mainly with air, relatively little carbon dioxide being required, if any; and subsequent production of calcium carbonate is avoided.

Instead, with acid raw water containing heavy metal cations, this raw water can be neutralized (to a pH of 5–8), e.g. with calcium hydroxide or calcium carbonate, which calcium carbonate can be recycled from the calcium carbonate produced, as described above, by the process. The heavy metal cations will then precipitate as hydroxides.

With raw waters which are acid but contain no heavy metal cations, and if there is no neutralization, hydrogen sulphide is produced immediately together with the barium sulphate upon barium sulphide addition; but if acid raw water without heavy metal cations is neutralized, then calcium sulphide is produced in solution, which can then be stripped as hydrogen sulphide from the water, using carbon dioxide.

When neutral raw water is treated or acid raw water is neutralized, any residual heavy metal cations can be precipitated as sulphides before barium sulphide addition by passing hydrogen sulphide through the water, using hydrogen sulphide stripped, after the barium sulphide addition, from the water.

When acid raw water containing heavy metal cations is neutralized as described above, heavy metals are separated before the barium sulphate is produced, so that it can be produced in relatively pure form; and as the heavy metals are precipitated chiefly as hydroxides, they present a far smaller environmental problem, if any.

Naturally, the barium sulphate precipitated and the calcium carbonate crystals precipitated may be separated from the water by suitable settling steps. In this regard, it will be appreciated that the process lends itself to continuous operation, with barium sulphate precipitation preferably taking place in a separate stage from the subsequent steps of hydrogen sulphide stripping and calcium carbonate precipitation. Thus, in a particular embodiment of the invention, the process may be operated on a continuous basis, the steps whereby the precipitation of the barium sulphate takes place, whereby the precipitation of the calcium carbonate takes place and whereby the stripping of the hydrogen sulphide from the water takes place being carried out in separate stages through which a continuous flow of water being treated passes in succession, namely a barium sulphate precipitation stage in which barium sulphate is removed from the water by settling, a calcium carbonate precipitation stage in which calcium carbonate is removed from the water by settling, and a hydrogen sulphide stripping stage in which the hydrogen sulphide is removed from the water by said stripping. As indicated above, the hydrogen sulphide stripping stage may follow the calcium carbonate precipitation stage, or vice versa, or indeed they can take place simultaneously.

The hydrogen sulphide produced can act as a raw material for sulphur production and the invention accordingly contemplates a suitable optional sulphur production stage or step, whereby the process includes the step of converting the hydrogen sulphide stripped from the water to sulphur in a separate sulphur production stage. In this stage sulphur is produced in known fashion, e.g. by oxidation of the hydrogen sulphide to sulphur using ferric ions which are thereby reduced to ferrous ions, such as by the Clauss process or the Stretford process. If the hydrogen sulphide has been stripped by means of carbon dioxide as described above, then the carbon dioxide can be separated from the stripped hydrogen sulphide gas, and recirculated back to the process for use in the stripping.

This invention further contemplates the step of treating the barium sulphate produced, after separation thereof, to produce barium sulphide for use in the initial raw water treatment. This may be effected by reduction thereof with coal e.g. at 1000°-1100° C. according to the reaction:

$$2C + BaSO_4 \rightarrow 2CO_2 + BaS \qquad (6)$$

Barium sulphate (barytes) make-up may be added during this step to compensate for any barium sulphate losses in the process.

The process may also include the step of adding powdered carbon (coal) to the raw water during the barium sulphide addition, to facilitate precipitation of the barium sulphate. Coal of a particle size of less than 500, preferably less than 100, microns may be used for this purpose, the relatively much smaller crystals of barium sulphate produced being adsorbed thereon for more rapid settling. This carbon can then be consumed in the subsequent barium sulphate reduction mentioned above. Thus, in particular embodiments of the invention, the process may include the steps of separating the precipitated barium sulphate from the water, converting it to barium sulphide and using the barium sulphide so obtained for the precipitation of the barium sulphate from the water; and the process may include the step of adding powdered carbon to the water during the barium sulphide addition to the water, to facilitate precipitation of the barium sulphate, the powdered carbon being coprecipitated with the barium sulphate and the converting of the barium sulphate to barium sulphide being by reduction of the barium sulphate with carbon at 1000°-1100° C.

Preferably, the barium sulphide addition takes place at a pH of 2 to 7 and in stoichiometric proportions relative to the sulphate. If the pH of the raw water is too low, it can be raised (before the barium sulphide addition) by adding calcium carbonate thereto, e.g. recirculated from the calcium carbonate precipitation step. The process may thus include the step of adding calcium carbonate to the water not later than the barium sulphide addition to the water, to raise the pH of the water to a suitable value in the range 2–7. This calcium carbonate may be calcium carbonate produced by the process, as described above, which is recirculated to the raw water. This step can aid in purification of the raw water by precipitating any heavy metals therein (e.g. Fe, Cr, Co, Ni, Al, On or the like) as the hydroxides. Conveniently, this calcium carbon addition can be carried out in a plurality of separate stages, which are thus at successively increasing pH's, selected such that a particular heavy metal (or metals) precipitates out as the hydroxide in each stage. Naturally, other suitable bases or alkalis, such as calcium hydroxide, may be used for this purpose, and to act as make-up for calcium carbonate losses in the process.

Similarly, the hydrogen sulphide stripping (when air is used from the stripping), may take place in a plurality of successive separate stages to which carbon dioxide is added so that they are at successively decreasing pH's, down to a final pH of preferably not less than 6, thereby to minimize calcium bicarbonate production.

It should be noted that, during the precipitation of barium sulphate, any remaining heavy metal ions will be precipitated, as the sulphides, together with the barium sulphate.

When the concentration of sulphate ions in the raw water is high, e.g. above 2000 mg/l, there is a danger that recirculation of calcium carbonate to the raw water as described above may lead to production of calcium sulphate in sufficient quantities for it to precipitate together with the heavy metal hydroxides. The sulphur in such sulphate is lost for sulphur production. The process may thus include the step, if necessary, of diluting the water to which the calcium carbonate and barium sulphide are added, using a proportion of the product water issuing from the process, to resist calcium sulphate coprecipitation together with the barium sulphate.

The invention will now be described, by way of example, with reference to the accompanying diagrammatic drawing, which shows a schematic flow diagram of a process in accordance with the present invention.

In the drawing, reference numeral 10 generally designates a flow diagram of the process of the present invention.

A raw water feed flow line 12 is shown feeding into a heavy metal removal stage, generally designated 14. The stage 14 comprises a plurality of settling stages 16, arranged in series in the direction of flow of water along the flow line 12. Two stages 16 are shown, but it will be appreciated that more than two can, if desired, be arranged in series with regard to the direction of water flow. The stages 16 are interconnected by water flow lines 18 along which treated water from the feed line 12 flows, in series from one stage 16 to the next. Each stage 16 has a heavy metal hydroxide sediment product discharge line 20.

A clear water feed line 22 is shown entering the raw water feed line 12, upstream of the heavy metal removal stage 14. In the heavy metal removal stage 14, a plurality of calcium carbonate feed flow lines 24 are shown, one for each settling stage 16, entering respectively the flow line 12 downstream of where the flow line 22 enters the flow line 12, and entering the respective flow lines 18 upstream of each stage 16. The calcium carbonate feed flow lines 24 branch from a common calcium carbonate supply line 26.

From the heavy metal removal stage 14 a treated water flow line 28 leads to a barium sulphide addition stage 30 in the form of a mixed tank. A powdered carbon (coal) feed line 32 is shown feeding into the feed line 28 immediately upstream of the barium sulphide addition stage 30, and a barium sulphide feed line 34 is shown feeding into the barium sulphide addition stage 30 via a supply tank [not shown] in which the barium sulphate is dissolved in water, before it passes to stage 30, the barium sulphide going into solution as BaS or $Ba[HS]_2$ and/or $Ba[OH]_2$ formed by the reaction $2BaS + 2H_2O \rightarrow Ba[HS]_2 + Ba[OH]_2$. From the barium sulphide addition stage 30 a flow line 36 leads to a barium sulphide settling stage 38 in the form of a settling tank.

The settling stage 38 has a product discharge line 40 leading to a barium sulphide production stage 42. The barium sulphide production stage 42 has a coal feed line 44 entering it, and also has a barium sulphate make-up feed line 46 entering it. The barium sulphide feed line 34 into the barium sulphide addition stage 30 leads from the barium sulphide production stage 42.

A treated water flow line 48 leads from the barium sulphate settling stage 38 to a hydrogen sulphide stripping stage generally designated 50. In the stripping stage 50 a plurality of stripping towers are arranged in series relative to the direction of water flow, two of which are shown. These towers are each designated 52 and are interconnected in series by a plurality of treated water flow lines 54. Each stripping tower 52 has a stripped gas outlet flow line 56, the flow lines 56 joining a common stripped gas flow line 58 which leads to a sulphur production stage 60 having a sulphur product outlet flow line 62.

Each tower 52 in turn has a calcium carbonate outlet flow line 64, which flow lines 64 join a common calcium carbonate flow line 66. Each tower 52 further has a stripping gas feed line 67, each flow line 67 being connected to a common supply of carbon dioxide and to a common supply of air in a fashion such that carbon dioxide and/or air from the respective source may be selectively fed therealong.

A treated water flow line 68 leads from the stripping stage 50 to a calcium carbonate settling stage 70. The settling stage 70 has a clean water product flow line 72 leading therefrom, and a calcium carbonate precipitate outlet flow line 74 leading therefrom.

In accordance with the process of the present invention raw water typically containing calcium ions, heavy metal ions and sulphate ions at a pH of about 2-7 enters the process along the flow line 12, this water being fed into the heavy metal removal stage 14.

In the heavy metal removal stage 14, calcium carbonate is fed via the flow lines 24 into the flow line 12 and into each flow line 18 respectively upstream of a settling stage 16. The amount of calcium carbonate fed is selected in each case to provide the immediately downstream settling stage 16 with a desired pH, suitable for the selective precipitation of a particular heavy metal hydroxide (or particular heavy metal hydroxides if they precipitate at the same pH). The desired pH will thus be determined by routine experimentation. Heavy metal hydroxides precipitating in the various settling stages 16 issue along the flow lines 20, and are in the hydroxide form wherein they are relatively harmless to the environment, and can be dumped to waste or, if desired, can be treated for the recovery of the heavy metal in question if this is economically attractive.

The water being treated, after removal of heavy metals therefrom in the stage 14, passes along flow line 28 to the barium sulphide addition stage 30. If desired, some hydrogen sulphide can be passed through the final settling stage 16, to precipitate any residual heavy metal cations as sulphides. Barium sulphide is added to the stage 30 via flow line 34 together with a particulate coal along feed line 32 which enters the flow line 28 upstream of the stage 30. The powdered coal fed along flow line 32 is of a particle size and in a quantity selected by routine experimentation to promote effective settling in the settling stage 38 of barium sulphate produced by reaction of the barium sulphide in the barium sulphide addition stage 30 with calcium sulphate from the raw water feed according to Reaction (1).

In the stage 30 thorough mixing of the barium sulphide [as BaS, $Ba[HS]_2$ and/or $Ba[OH]_2$] into the process water takes place, and this water is fed from stage 30 along flow line 36 to the settling stage 38. In the settling stage 38 barium sulphate settles and passes along flow line 40 to the barium sulphide production stage 42. In the barium sulphide production stage 42, barium sulphate is reduced to barium sulphide by reduction with coal from the coal feed line 44 at an elevated temperature of about a 1000° C. in known fashion e.g. in a rotary kiln. To the stage 42 barium sulphate (barytes) is fed as make-up along flow line 46 to cater for any barium losses in the process.

It will be appreciated that in the stage 30, pipe mixing may be employed instead of an impeller. Furthermore, stage 30 and stage 38 can be replaced by a fluidized bed wherein mixing takes place and $BaSO_4$ crystal growth takes place, and from which $BaSO_4$ is withdrawn. This aids in settling, and clear water can be withdrawn therefrom.

Process water from which barium sulphate has been precipitated passes along flow line 48 to the stripping stage 50. In the stripping stage 50 a mixture of air and carbon dioxide is fed into each stripping tower 52 along its associated flow line 67. The carbon dioxide in question reduces the pH of the water in the tower to a desired value, in the range 8 to 6, there being a successive reduction in pH from one tower 52 to the next in the direction of process water flow. In each tower the carbon dioxide in the stripping gas reacts with dissolved calcium sulphide in the process water according to Reaction (2) to produce hydrogen sulphide which is stripped from the tower as gas from the stripping tower along the associated flow line 56, and to produce calcium carbonate which issues from the tower as a crystal precipitate along the associated flow line 64.

Stripped gas from the flow lines 56 enters the flow line 58 and then the sulphur production stage 60. The sulphur production stage a suitable process such as the Claus or Stretford process may be used to produce sulphur, e.g. by oxidation of the hydrogen sulphide employing ferric ions to produce sulphur and ferrous ions. Sulphur product issues from the stage 60 along the flow line 62.

Product water leaves the stripping stage 50 along the flow line 68 to the calcium carbonate settling stage 70. In the calcium carbonate settling stage 70 residual calcium carbonate crystals in the process water are settled and issue as a by-product of the process from the stage 70 along the flow line 74. Calcium carbonate produced in the towers 52 and issuing therefrom along flow lines 64 passes along common flow line 66 into the calcium carbonate product flow line 74. The calcium carbonate common supply line 26, which leads to the calcium carbonate flow lines 24, issues from the flow line 74 as a branch flow line.

Purified clean water from the settling stage 70 issues along the purified product water flow line 72.

It will be appreciated that the raw water feed along flow line 12 may have an excessively high sulphate ion concentration, in which case, after calcium carbonate addition in the heavy metal removal stage 14, an excessively high calcium sulphate concentration may be obtained in the process water, leading to calcium sulphate precipitation in the settling stages 16 which is undesirable, as this sulphate is lost to the process and leads to a reduction in eventual sulphur production in the sulphur production stage 60. In this case it is desirable to dilute the raw water feed with clean water, and this can be effected along flow line 22 which branches from the clean water product flow line 72.

It will further be appreciated that, optionally, instead of stripping in the stripping towers 52 with a mixture of carbon dioxide and air, carbon dioxide can be used by itself. This leads to saturation of the process water in the stripping stage 50 with carbon dioxide, and the production of calcium bicarbonate therein instead of calcium carbonate. This calcium bicarbonate will remain in solution, so that the flow lines 64 and 66 can be eliminated and, if desired, carbon dioxide may be recovered from the sulphur production stage 60 and recycled to the stripping stage 50 as carbon dioxide feed along a suitable flow line (not shown) leading into flow line 67. In this case, the plurality of stripping towers 52 may be replaced by a single stripping tower as the option of having different pH's in different stripping towers will not be available, bearing in mind that each stripping tower will be saturated with carbon dioxide. Accordingly, in this case, calcium hydroxide may be added along a flow line indicated at 76, which enters the flow line 68 downstream of the stripping stage 50. This calcium hydroxide is added in a stoichiometric quantity sufficient to react with the calcium bicarbonate in accordance with Reaction (4) to convert the calcium bicarbonate to calcium carbonate for settling in the settling stage 70.

It is an advantage of the invention that it provides a versatile and easily controlled process for the reduction of the sulphate ion content in raw water which is unsuitable for discharge into the environment. Such raw waters are encountered in e.g. gold mines slimes dam recovery plants, acid mine drainage waters, gold mine filter plant wash water, power station cooling water or the like. In the process, sulphur can be produced as a by-product together with calcium carbonate, and heavy metals can be removed, and if necessary recovered as by products. Calcium content in the raw water can also be reduced.

The process uses relatively freely available and inexpensive raw materials, namely coal, carbon dioxide, air and calcium hydroxide, together with a relatively low consumption of barium sulphate (barytes), the barium being essentially recirculated and only make-up quantities to cater for losses being required.

In laboratory-scale tests conducted by the Applicant, sulphate ion content reduction has been demonstrated to be possible of the order of from 1900 mg/l down to 100 mg/l. After hydrogen sulphide stripping a sulphide content in the product water of the order of no more than 10 mg/l has been demonstrated to be feasible, with a clean water product containing acceptably low sulphate, sulphide, heavy metal, barium and calcium levels, and an acceptable pH for returning to the environment.

It will be appreciated that any magnesium ions in the water being treated will precipitate as the hydroxide in the heavy metal removal stage 14; and any ammonium ions in the water being treated will be stripped as ammonia, together with $H_2S$, in the stripping stage 50, provided the pH therein is sufficiently high, e.g. above 10.

We claim:

1. A chemical process for the treatment of water which is acidic, having a pH of 0–5, and which contains dissolved calcium and sulfate ions, so as to produce a purified product water having a reduced sulfate ion concentration, which comprises the steps of:
    neutralizing the water to a pH of 5–8;
    adding barium sulfide to the water to cause precipitation of barium as barium sulfate from the water, and to produce calcium sulfide in solution in the water at a pH of 10–13;
    treating the water from which the barium sulfate has been precipitated with carbon dioxide, to form hydrogen sulfide in the water and to release carbonate in the water;
    stripping the hydrogen sulfide from the water;
    separating the precipitated barium sulfate from the water;
    converting the separated barium sulfate to barium sulfide; and
    using barium sulfide obtained from the conversion of barium sulfate for the addition of barium sulfide to cause said precipitation of barium sulfate from the water, and wherein the carbonate produced in the water by the carbon dioxide treatment is precipitated as calcium carbonate from the water, and wherein said neutralization of the water to pH of 5–8 includes the addition of said precipitated calcium carbonate to the water no later than the barium sulfide addition.

2. A process as claimed in claim 1, in which the treatment of the water with carbon dioxide is such as to convert all the sulphide dissolved in the water to hydrogen sulfide from the water, the stripping of the hydrogen sulfide from the water being by means of air used as a stripping gas.

3. A process as claimed in claim 1, in which the treating of the water with carbon dioxide is sufficient to convert all the sulfide dissolved in the water to hydrogen sulfide, the stripping of the hydrogen sulphide from the water being by means of additional carbon dioxide used as a stripping gas and the process including the step, after the stripping, of converting any calcium bicarbonate dissolved in the water to calcium carbonate which precipitates from the water.

4. A process as claimed in claim 1, in which the process is operated on a continuous basis, the steps whereby the precipitation of the barium sulfide takes place, whereby the precipitation of the calcium carbonate takes place and whereby the stripping of the hydrogen sulfide from the water takes place being carried out in separate stages through which a continuous flow of water being treated passes in succession, namely a barium sulfide precipitation stage in which barium sulfide is removed from the water by settling, a calcium carbonate precipitation stage in which calcium carbonate is removed from the water by settling, and a hydrogen sulfide stripping stage in which the hydrogen sulfide is removed from the water by said stripping.

5. A process as claimed in claim 1, which includes the step of converting the hydrogen sulfide stripped from the water to sulfur in a separate sulphur production stage.

6. A process as claimed in claim 1, which includes the step of adding powdered carbon to the water during the barium sulfide addition to the water, to facilitate precipitation of the barium sulfate, the powdered carbon being coprecipitated with the barium sulfate and converting the barium sulfate to barium sulfide by reducing the barium sulfate with carbon at 1000°–1100° C.

7. A process as claimed in claim 1, which includes the step of diluting the water to which the calcium carbonate and barium sulfide are added, using a proportion of the produce water issuing from the process, to resist calcium sulfate coprecipitation together with the barium sulfate.

8. A process as claimed in claim 1, in which the water which is treated contains heavy metal ions, the neutralization takes place before the barium sulfide addition and the heavy metal cations are precipitated as the hydroxides thereof, the precipitated heavy metal hydroxides being separated from the water before the barium sulfide addition.

9. A chemical process for the treatment of water which is acidic, having a pH of 0–5 and containing dissolved calcium, heavy metal and sulfate ions, so as to produce a purified produce water having a reduced sulfate ion concentration, which comprises the steps of:
neutralizing the water to a pH of 5–8;
adding barium sulfide to the water to cause precipitation of barium as barium sulfate from the water and to produce calcium sulfide in solution in the water of a pH of 10–13;
treating the water from which the barium sulfate has been precipitated with carbon dioxide, to form hydrogen sulfide in the water; and
stripping the hydrogen sulfide from the water, the process including the step whereby the water is neutralized so as to cause precipitation of heavy metal cations as hydroxides therefrom before the barium sulfide addition takes place.

10. A process as claimed in claim 9, in which the precipitation of heavy metal cations as hydroxides takes place in a plurality of different stages at a different pH in each stage, whereby selective precipitation of different heavy metal hydroxides takes place in the different stages.

11. A chemical process for the treatment of water containing dissolved calcium, heavy metal and sulfate ions, so as to produce a purified produce water having a reduced sulfate ion concentration, the process comprising the steps of:
adding barium sulfide to the water to cause precipitation of barium sulfate from the water,
treating the water from which the barium sulfate has been precipitated with carbon dioxide to form hydrogen sulfide in the water; and
stripping the hydrogen sulfide from the water, the process including the step whereby, no later than the barium sulfide addition to the water at least part of the hydrogen sulfide stripped from the water is passed through the water to cause precipitation of heavy metal ions from the water as their sulfides.

12. A process as claimed in claim 11, in which the water being treated is acidic, having a pH of 0–5, the process including the steps of neutralizing the water to a pH of 5–8 to cause the precipitation of heavy metal ions as hydroxides therefrom, before the hydrogen sulfide is passed through the water, so that the hydrogen sulfide precipitates residual heavy metal ions, remaining after the hydroxide precipitation, from the water.

13. A chemical process for the treatment of water containing dissolved calcium and sulfate ions, so as to produce a purified product water having a reduced sulfate ion concentration, the process comprising the steps of:
adding barium sulfide to the water to cause precipitation of barium sulfate from the water;
treating the water from which the barium sulfate has been precipitated with carbon dioxide to form hydrogen sulfide in the water; and
stripping the hydrogen sulfide from the water, the process including the steps whereby powdered carbon is added to the water during the barium sulfide addition to the water to facilitate precipitation of the barium sulfate, the powdered carbon being coprecipitated with the barium sulfate and converting the barium sulfate to barium sulfide by reducing the barium with carbon at 1000°–1100° C.

* * * * *